(12) United States Patent
Eriksson et al.

(10) Patent No.: US 9,488,441 B2
(45) Date of Patent: Nov. 8, 2016

(54) METHOD AND SYSTEM OF MISSION PLANNING

(75) Inventors: Jan Erik Eriksson, Linköping (SE); Kristian Lundberg, Vreta-Kloster (SE)

(73) Assignee: SAAB AB, Linkoeping (SE)

(*) Notice: Subject to any disclaimer, the term of this patent is extended or adjusted under 35 U.S.C. 154(b) by 72 days.

(21) Appl. No.: 14/399,132

(22) PCT Filed: May 11, 2012

(86) PCT No.: PCT/SE2012/050501
§ 371 (c)(1),
(2), (4) Date: Feb. 2, 2015

(87) PCT Pub. No.: WO2013/169157
PCT Pub. Date: Nov. 14, 2013

(65) Prior Publication Data
US 2015/0316352 A1    Nov. 5, 2015

(51) Int. Cl.
*G06F 19/00*    (2011.01)
*F41G 3/04*    (2006.01)
*G06Q 10/06*    (2012.01)
*F41G 9/00*    (2006.01)

(52) U.S. Cl.
CPC . *F41G 3/04* (2013.01); *F41G 9/00* (2013.01); *G06Q 10/06* (2013.01)

(58) Field of Classification Search
CPC ............ F41J 5/06; G05B 19/00; G06G 7/80; G06G 7/32; F41G 3/06; F41G 5/08; F41G 5/00; F41G 11/00
USPC ............... 235/400, 404, 411, 412, 413, 417; 705/8, 12
See application file for complete search history.

(56) References Cited

U.S. PATENT DOCUMENTS

2006/0184291 A1    8/2006    Paradis et al.

FOREIGN PATENT DOCUMENTS

EP    1666842 A1    6/2006
WO    WO 98/05017 A1    2/1998
(Continued)

OTHER PUBLICATIONS

European Patent Office, Extended European Search Report for Application No. 12876509.6, Nov. 12, 2015, 7 pages, Germany.
(Continued)

*Primary Examiner* — Karl D Frech
(74) *Attorney, Agent, or Firm* — Alston & Bird LLP

(57) ABSTRACT

The present invention relates to a method and system for mission planning. The method comprises the steps of: —providing (805) information related to a target scene, said information comprising information related to a plurality of targets, —providing (810) information related to a plurality of resources for target attack, —determining (820) at least one possible attack direction against each target, —determining (830) a target effect associated to attacking the target from each of said determined at least one possible attack direction for each target, —forming (840) a network of possible routes between the targets for the resources, wherein the possible routes are determined based on the possible attack directions related to each target, and —forming (845) the mission plan for fighting the targets based on the determined target effects from the respective attack directions and based on the formed net¬ work of possible routes, wherein each target is fighted a predetermined amount of times.

19 Claims, 5 Drawing Sheets

(56) References Cited

FOREIGN PATENT DOCUMENTS

WO    WO 2006/027319 A1    3/2006
WO    WO 2009/091431 A1    7/2009

OTHER PUBLICATIONS

International Searching Authority, International Search Report and Written Opinion for International Application No. PCT/SE2012/050501, Mar. 22, 2013, 11 pages, Swedish Patent and Registration Office, Sweden.

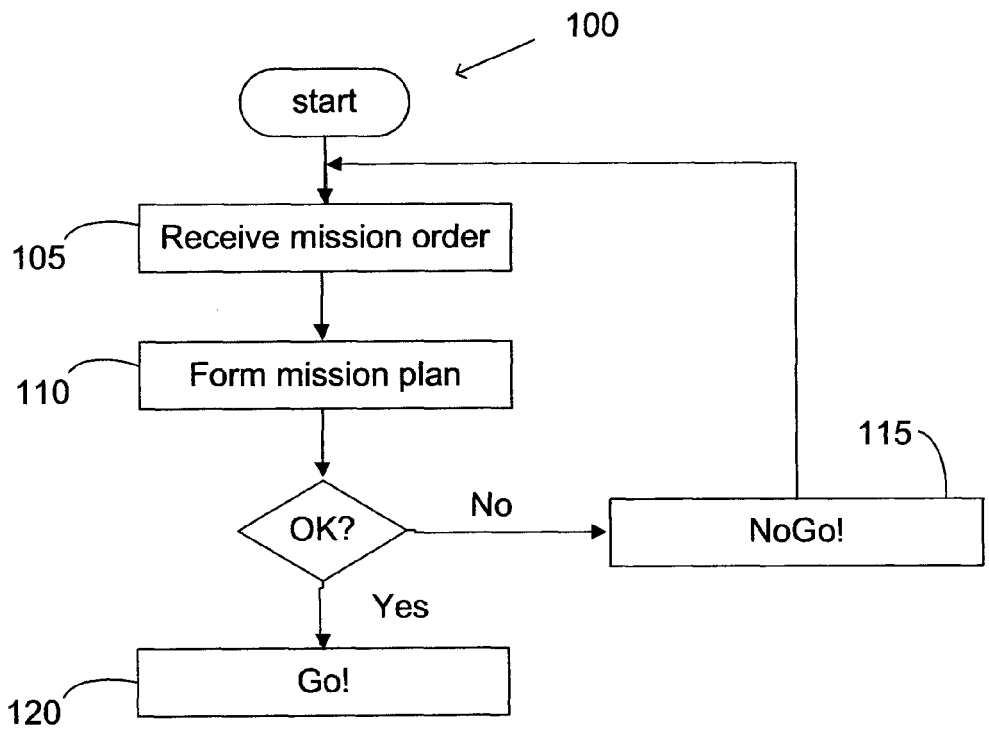
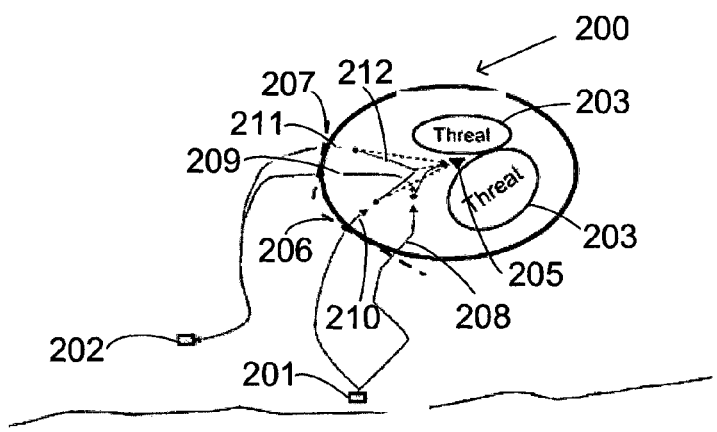

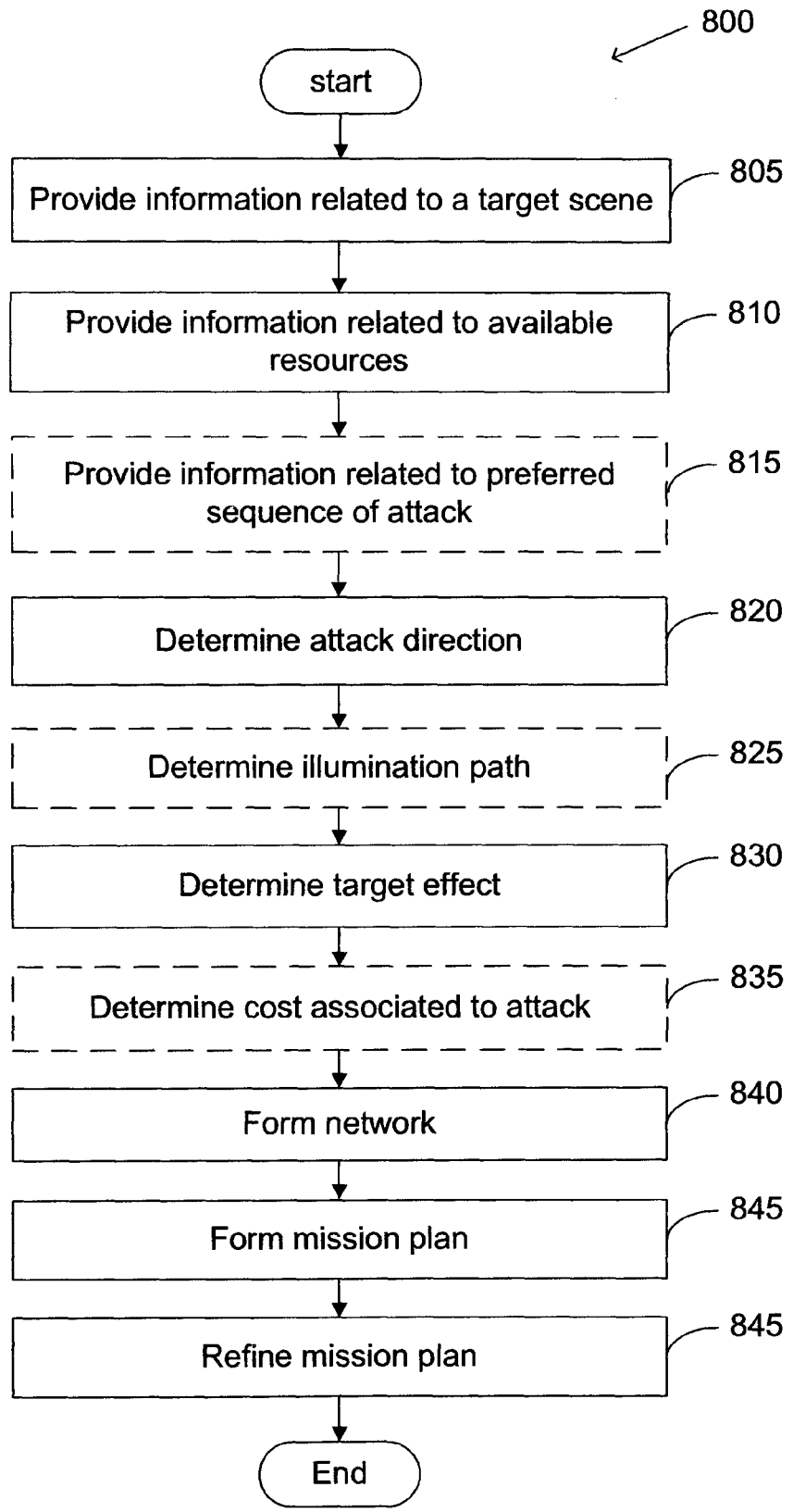

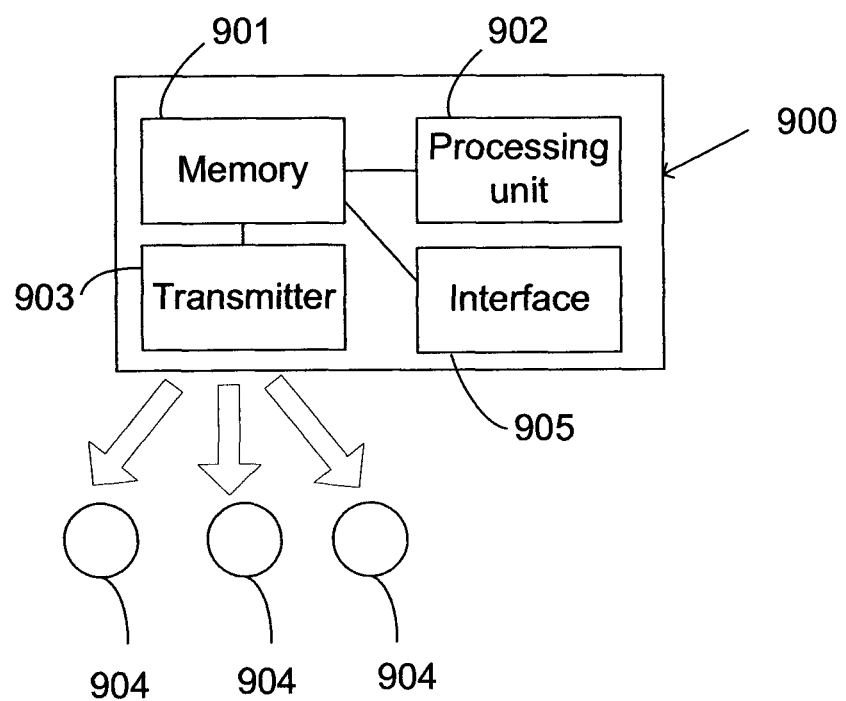

METHOD AND SYSTEM OF MISSION PLANNING

CROSS REFERENCE TO RELATED APPLICATIONS

This application is a National Stage Application, filed under 35 U.S.C. §371, of International Application No. PCT/SE2012/050501, filed May 11, 2012, the contents of which as is hereby incorporated by reference in its entirety.

BACKGROUND

1. Related Field

The present invention relates to a method and system for mission planning.

2. Description of Related Art

Military mission planning is a complex task which requires interactions and pre-requisites in both time and space. A mission plan can be seen as a proposed sequence of actions that fulfil mission requirements from a higher hierarchical level, while smooth cooperation with own forces and other missions is obtained. Mission requirements are also provided by the rules of engagement, which in short refers to general permissions during execution of a military mission.

Accordingly, a mission plan comprises the fundamental information for success and acts as a "map" in a phase of conduction of the mission. Objectives and constraints in the plan have to be strictly met in order to synchronize and keep safety of the own troops and equipment. Further, it is important that a clear situation assessment is available throughout the mission. Many "pieces" have to work together like a clockwork and when they do not, actions have to be taken to coordinate and replan the mission or parts of the mission. For a high hierarchy commander, situation awareness is critical as well as fast and effective planning/replanning capability. The commander gets valid information about ongoing actions in time and space and when needed, replanning is ordered based on a best knowledge of what to do and when. To sum up, solid intelligence and robust planning are the corner stones for successful mission conduction.

BRIEF SUMMARY

One object of the present invention is to provide an improved method and system for mission planning.

This has in accordance with one example of the invention been achieved by means of a method for mission planning. The method comprises
  providing information related to a target scene, said information comprising information related to a plurality of targets,
  providing a information related to a plurality of resources for target attack,
  determining at least one possible attack direction against each target,
  determining a target effect associated to attacking the target from each of said determined at least one possible attack direction for each target,
  forming a network of possible routes between the targets for the resources, wherein the possible routes are determined based on the possible attack directions related to each target, and
  forming the mission plan for fighting the targets based on the determined target effects from the respective attack directions and based on the formed network of possible routes, wherein each target is fighted a predetermined amount of times.

In one option, the target effect associated to attacking the target from each of said determined at least one possible attack direction is based on the information related to the targets.

In one option, the information related to the targets comprises the target's resistance against attack from different attack directions.

In one option, the forming of the mission plan for fighting the targets is based on information related to the collateral damage. For example, the information related to the target may comprise information related to the collateral damage caused by an attack from the respective attack directions.

In one option, the information related to the target scene comprises information related to at least one object to be protected and wherein the formation of the network includes removing attack directions which would cause collateral damage to the at least one protected object.

In one option, the method further comprises:
  providing information related to at least one resource for target illumination during the target attack, and
  providing for each of said determined at least one possible attack direction for each target at least one possible illumination path for illuminating the target during the attack,
  the forming of the network includes forming possible routes between the possible illumination paths related to the respective targets, and
  the forming of the mission plan is based on the target attack requiring two resources, one attacking resource and one illuminating resource, for at least one of the targets.

In one option, the method comprises providing information related to a preferred sequence of attacking the targets wherein the forming of the mission plan also is based on the target sequence information.

In one option, an engagement zone is defined for each target and each attack direction formed within said engagement zone. The engagement zone may be three dimensional. The at least one of the attack directions is in one option divided into a plurality of possible attack positions distributed within the engagement zone, wherein target effect is determined for each attack position and wherein the network is formed from determining possible routes based on the possible attack positions related to each target.

In one option, the at least one resource comprises at least one attack capability and one illumination capability. The targets are in one option land based.

The forming of the mission plan includes in one example selecting routes between the targets so as to satisfy time limitations for the mission plan.

The information related to a target scene comprises in one option information related to at least one threat in the target scene, wherein the method further comprises determining a cost associated to attacking from each attack direction or position based on the threat information and wherein the forming of the mission plan includes selecting routes between the targets based on the costs.

The formation of the network includes in one option selecting a subset of the attack directions or attack points based on the costs associated to attacking and basing the network on the subset of attack directions or attack positions.

The method comprises in one option a post processing step comprising refining the routes of the resources as defined by the formed mission plan.

The invention also relates to a system for mission planning arranged to plan routes for a plurality of resources fighting a plurality of targets, comprising:
- a memory storing information related to a target scene, said information comprising information related to the targets and information related to available resources.
- a processing unit arranged to determine at least one possible attack direction against each target, determining a target effect associated to attacking the target from each of said determined at least one possible attack directions for each target, forming a network of possible routes between the targets for the resources, wherein the possible routes are determined based on the possible attack directions, and forming the mission plan for fighting the targets based on the calculated target effects from the respective attack directions and based on the network of possible routes, wherein each target is preassumed to be fighted a predetermined amount of times. The memory may be arranged to store the mission plan. A transmitter may be arranged to transmit the mission plan to the respective resources. The resources comprise in one option aerial vehicles.

BRIEF DESCRIPTION OF THE FIGURES

FIG. 1 is a flowchart showing an overview of operational planning.

FIG. 2 is an illustration of a first example of a mission plan.

FIG. 8 is a flow chart showing an example of a method for mission planning.

FIG. 9 is a block scheme showing a system for mission planning.

DETAILED DESCRIPTION OF VARIOUS EMBODIMENTS

Figure 3:
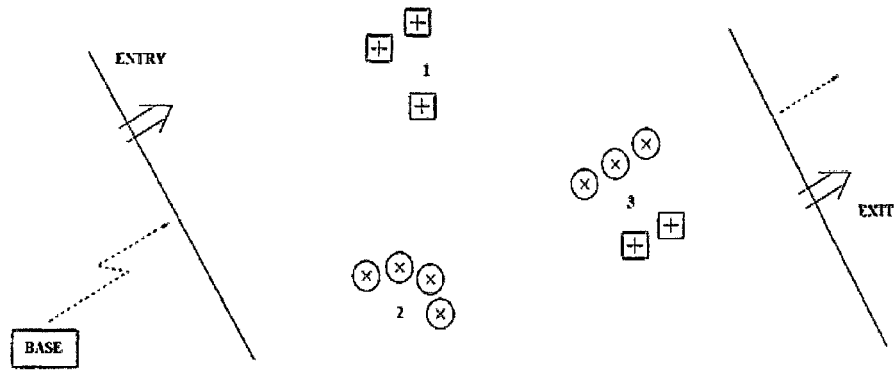
FIG. 3 is an illustration of a target scene.

In FIG. 1, a method 100 for operational planning begins upon the receipt 105 of a mission order. The mission order comprises in one example a detailed description of a target scene, required target effect objectives (e.g. destroyed or neutralized) and/or timing requirements. The mission order comprises in one example also tactical information. The tactical information may be described as Forward Line of Own Troops (FLOT). The tactical information comprises in one example target scene entrance- and exit points or directions, threats and protected objects not to be harmed by the attack. The threats are for example known surface-to-air missile sites (SAM-sites). The protected objects are for example hospitals and/or schools. All the information in the mission order can be given in a so called Air Task Order (ATO). A mission plan is formed 110 upon reception of the mission order. The formation 110 of the mission plan comprises in one example to sequence the targets, and to allocate and route the resources for fighting the targets according to the mission order or ATO. If the required target effect objectives and/or timing requirements can not be fulfilled, a feedback not to go (NoGo feedback) may be returned 115 from the mission planning step. Thus, if a mission plan order is badly stated, this is revealed in the mission planning step and a "NoGo" can be returned from the mission planning step. A replanning may then be necessary at a strategic level and eventually a new, better stated mission plan can be formed and delivered. If the required target effect objectives and/or timing requirements can be fulfilled, a feedback to go (Go feedback) may be returned 120 from the mission planning step.

FIG. 2 shows a target scene 200 with a proposed routing from a first base 201 to a second base 2 in accordance with a mission plan. The mission plan has been formed based on data of the target scene and timing constraints. The mission plan has also been formed based on available resources for fighting the target. The data of the target scene comprises in the illustrated example data related to one target 205 and two threats 203. The data of the target scene comprises also an entrance line 206 and an exit line 207. In a not illustrated example, the entrance and/or exit lines are represented as points or directions. In the illustrated example, two resources have been used. One resource has been used for attacking the target and one resource has been used for illumination of the target during the attack. The mission plan is effect oriented wherein the effect of a mission is the primary issue. The objective is to maximize the effect within the target area. Routing towards and from the target scene is done in a secondary step and will not be discussed further herein. However, it is straight forward to interface all mission phases with the formed mission plan as disclosed herein.

In the illustrated example, the mission plan for fighting targets has been formed based on the target effect determined from one or a plurality of attack directions associated to the target and based on a network of possible routes formed from the determined attack directions. In the illustrated example with only one target, the mission plan comprises for the attacking resource a first route 208 towards the target and a second route 209 from the target. The mission plan comprises for the illuminating resource a first route 210 towards the target and a second route 211 from the target. It further comprises an illumination path 212. While being in the illumination path 212, the resource is planned to illuminate the target during the attack.

In FIG. 3, an example of a target scene is illustrated. The target scene comprises in the illustrated example targets, defenders and protected objects. The target scene is also defined by a line or point of entrance and a line or point of exit for resources used for fighting the targets. The targets are in the illustrated example denoted 1, 2 and 3. The targets can be categorized based on which types of objects the targets are. The object types include for example house, bunker, infrastructure or other ground based military object types. The resources may for example include aerial vehicles such as aircrafts. The resources may instead or in addition thereto comprise ground based vehicles. The ground based vehicles can be land based and/or sea based. The resources used for fighting the targets are started from a base. The base is in one example positioned on the ground. Alternatively, the base is placed on one or a plurality of hangar ships, usually situated far away from the target scene. The resources enter the scene at the entry line or entry point or entry direction. When the mission has been carried out, the resources leave the scene at the exit line or exit point or exit direction. From there, the resources turn back to the base (or go to some other base). The target scene of the illustrated example in FIG. 3, includes as mentioned above three targets. The threats are illustrated with "x". The protected objects are illustrated with "+".

The mission time is for example defined as the time between the first platform passes the line or point or direction of entry and the last platform passes the exit line or point or direction. The diameter of a target scene is in one example in the order of 100 km. The distances between the targets is in one example in the order of a few kilometers. The timespan of a mission is in one example in the order of one hour. In one example, an attack involves 6-8 targets and 4-6 resources for fighting the targets.

Figure 4:
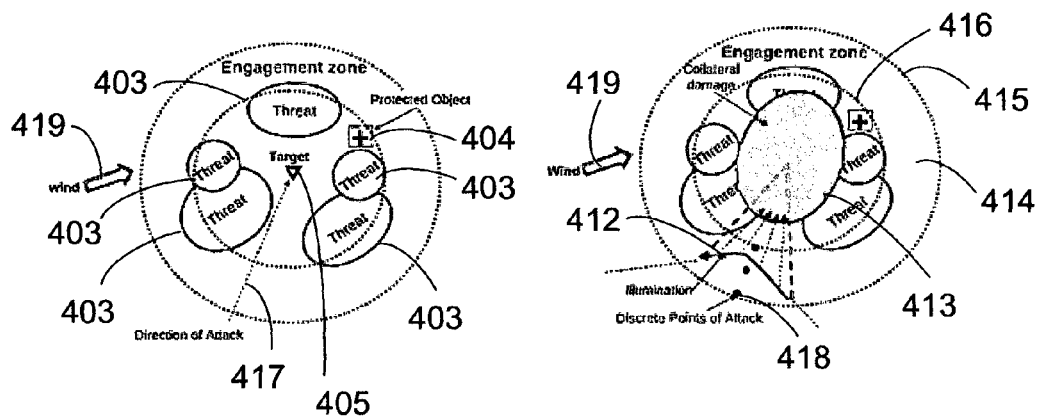
FIG. 4 illustrates considerations taken regarding to each target in forming the mission plan.

FIG. 4 illustrates in two views illustrations taken regarding to each target in forming the mission plan. In detail, FIG. 4 shows a target 405 protected by several threats or defenders 403. The threats 403 may for example be SAM sites as stated above. A projected object 404 is also present. The projected object 404 is placed in close relation to the target 405 and threats 403. As is clear from the above, a protected object is an object which has to be left untouched during an attack. Risk scenario calculations can be derived based upon potential damages such as debris or collateral damage in order to guarantee safety. The collateral damage can be illustrated with a footprint defining a zone 413 affected by an attack. The zone 413 for the collateral effect is weapon specific and dependent on attack direction in relation to the target. Note that terrain, ground and weather (except wind) conditions are left out in this description due to simplicity. It is of course possible to introduce them as effect contributing parameters but they will not change the basic principles of how the planning is set up and solved. However, in a practical implementation, those parameters are likely to be included.

In order to handle firing ranges for a specific weapon type fired by the resource, an engagement zone 414 is formed around the target(s) 405. An outer limit or radius 415 defines the maximum firing range at a specific speed and altitude of a resource carrying the weapon. For the simplicity of this description, all the weapons used in the mission have the same capabilities. In the illustrated example, also an inner limit or radius 416 for the engagement zone 414 is formed. The inner limit or radius 416 or is for example related to a too short lock on time for a target seeker. In our description and for simplicity, it is assumed that a standard cruising speed of the resources is used making the engagement zone physically fixed. In the case wherein the engagement zone is limited both by the outer and inner radius, the engagement zone then may have the shape of a hollow cylinder. However, at least in the case wherein the resources are ground based, the engagement zone used in the calculations may also be two dimensional.

In order to parameterize the target scene, possible attack directions 417 are formed within the engagement zone. The possible attack directions are arranged in sectors of the engagement zone. In one example, the engagement zone is divided into three to eight, for example six sectors. Each sector comprises an attack direction directed at the target. In the illustrated example, only the selected attack direction is illustrated. Each attack direction is in one example divided into a plurality of discrete attack points 418 each associated to the attack direction. Thus, the possible attack positions are arranged in sectors in accordance with an associated attack direction. Moreover, since some weapon systems need guidance to designate a target, an illumination path 412 can be added and associated to each possible attack direction or to each possible attack point. An illuminator is a resource having an illuminating system arranged to consistently point at the target after firing the weapon until impact. The illuminating system is in one example a laser pod.

In the engagement zone, the objective is to find the best attack direction and/or attack positions with the optimal probability of destroying a target. Effect of each possible attack direction or point is determined based on geometrical and/or dynamical considerations. In the example as illustrated in FIG. 4, collateral damage is as discussed above also considered. In this specific situation the protected object has some clearance and that attack position can be used. In one example, any possible attack position which causes collateral impact on protected objects is discarded from the possible attack points. In FIG. 4, also a wind direction 419 is shown.

Figure 5:
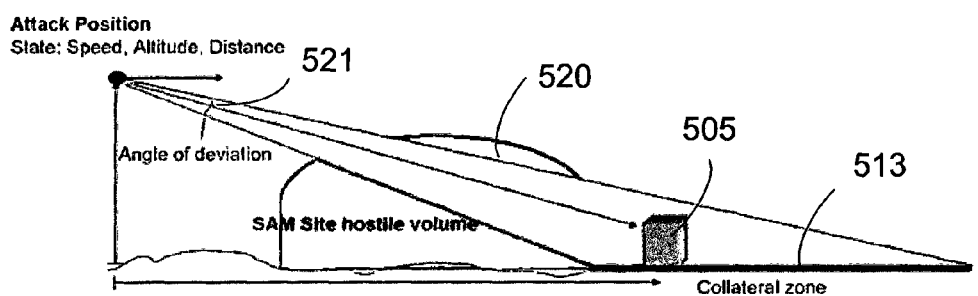
FIG. 5 shows an illustration of the determination of a target effect.

In FIG. 5, the determination of a target effect is illustrated. The target effect is for example determined based on distance, speed of the resource firing the weapon, angle at impact and the degrading fact that a missile path can pass a threat so that there is an obvious probability of being shut down. Further, a collateral damage or footprint is defined. One footprint is associated to each attack position. An angle of deviation 521 represents a possible deviation of the attack from the intended attack position. In the illustrated example, the collateral zone or footprint 513 has an elliptic shape due to fixed angles of deviation corresponding to an erroneous missile performance. Thus, the extension of the footprint is determined based on the 3D position of the attack in relation to the target 505 and the angle of deviation 521. Further, a hostile volume 520 is associated to each threat.

Figure 6:
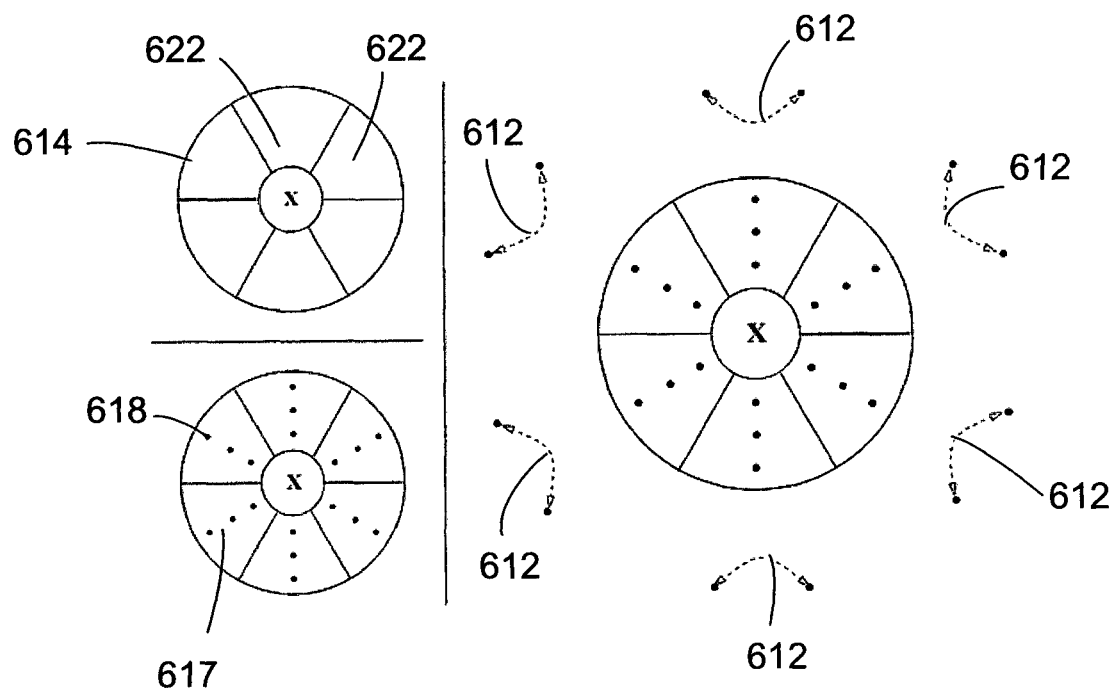
FIG. 6 shows a scheme for processing potential attack positions.

In FIG. 6, a scheme for processing potential attack positions is illustrated. As was mentioned in relation to FIG. 4, possible attack directions 617 are formed within an engagement zone 614. The possible attack directions are arranged in sectors 622 of the engagement zone 614. Each sector comprises an attack direction 617 directed at the target. Each attack direction 617 is in one example divided into a plurality of discrete attack points 418 each associated to the attack direction. An illumination path 612 is further associated to each attack direction. The mission objective is to destroy a number of targets in a given time frame and with a low risk of exposure. Therefore it is desirable to strive to find a combination of safe routing and the choice of high effect attack directions or positions. Thus, this is a routing problem with multiple resources. This can be addressed as a special case of a Vehicle Routing Problem.

The above discussion provides an understanding of the vital aspects and building blocks of a mission planning scenario. To make the big picture complete, sequencing should be mentioned briefly as the requirements due to some cooperative effect between the targets or due to weather conditions of attacking targets in a specific order.

As a summary, aircraft mission planning involves all or some of the steps: sequencing, weaponeering, routing and Deconfliction. Weaponeering is the set up of the target scene with effect measures and potential collateral effects. Routing is the creation of a network and solving the related routing problem. Deconfliction holds functionality to make the resulting mission plan conflict-free in time and space.

Since the above described formulation shows a modular property with distinct and clear interfaces, different parts of the problem can be modelled with different ambitions and granularity. For instance we can thoroughly investigate the sequencing problem putting less effort on the actual mission plan in detail. On the other hand we can disregard sequencing as a forcing constraint and put focus on weaponeering and routing. The last block, deconfliction covers the task of resolving conflicts in time and space for all resources during the mission plan.

The potential requirements on sequencing or the fact that targets have to be fighted in a specific order comes from tactical aspects. The disclosure herein covers precedence in the whole range from no precedence up till a predefined target sequence. Some issues to take into consideration with regard to in which order different targets are fighted are for example the use illumination guidance, a target must be fully visible. If debris and dust are stirred up by preceding attacks and transported by wind, the whole attack may fail. As a consequence, wind direction and wind speed is important to consider as well as the expected 'stir-up' effect from an attack. Wind is indicated in FIG. 4.

Figure 7:
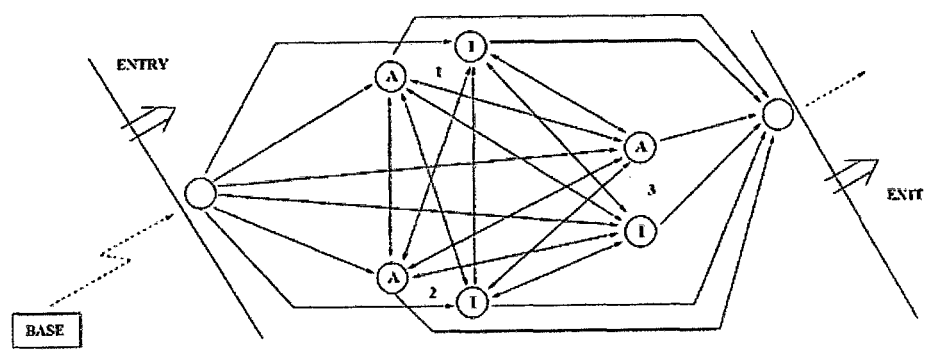
FIG. 7 shows an example of a network.

In FIG. 7 illustrates connections between targets in a more cooperative manner. In FIG. 7, a plurality of hostile targets 1, 2, 3 cover each other in a way that one sequence might be better than another. If an attack shall be performed with missile paths crossing connected hostile target zones, such as SMA zones, the chance of success will be lower. So, for the instance in FIG. 7, a successful strategy is to first remove target 1 and then target 2 which removes all sheltering possibilities in any preceding target sequence. This understanding would produce a mission plan with a higher probability of success.

In a not illustrated example, in which the costs for attacking the targets are sequence dependant, a powerful central firing control radar is the backbone for the three hostile target sites and their responsiveness and efficiency. If the central radar station is removed first, the hostile target sites will only rely on their own, representing their inner circles, and becomes less agile. Thus, also in this case the analyse of a good sequence is the key to success. There is an obvious possibility of having a target scene including all three of the above types of precedence constraints. In such a mixed environment a thorough sequence analysis is preferred. However, this disclosure does not relate to the problem of providing sequences for fighting targets, it just handles all kinds of sequencing.

In mission planning, a pre-processing step is performed so as to provide data for a mathematical model. The data may include parameters and sets. This step comprises a plurality of substeps. In one substep, the attack space is discretized and a network representation is created including all possible routes of the resources. Further, in pre-processing, the targets may be clustered into different partitions which can be solved independently. The criteria for these partitions may be that all distances between clusters widely exceeds that of inter-cluster targets, hence making it uninteresting to solve the mission planning problem for all targets at once others. The resources, such aircraft, sometimes need to return to their base for refuelling and re-armouring in between the clusters, but otherwise one can for example solve a small travelling salesman problem to decide in which order the partitions should be attacked. Alternatively, the resources are split up in order to attack all clusters simultaneously. It is also possible that an attack order is decided manually for other reasons.

The pre-processing may also comprise a substep of sequencing the targets. For example, due to strong wind conditions, a natural sequence might be necessary in order to avoid stirring up dirt which will drive away and cover other targets, making it impossible to illuminate and attack them. Other factors might be the result of an analysis of mutual dependencies, allowing for a much greater effect towards the targets or increased survival rate. Alternatively, a choice of a high ranked commander may be used for sequencing.

The pre-processing may also involve tactics involving issues that are difficult to model and quantify, like experience and human opinions, and hence must be settled before a mathematical framework can be used.

In one example, we assume airspace supremacy, which means that no enemy aircraft is present. This allows for only considering flight paths on relatively high altitude, high enough to avoid all threats on the ground. It means that we only need to consider one altitude layer, i.e. making the problem 2-dimensional.

One thing that becomes relevant in the situation of no airspace supremacy is the tactical aspect for the attacker. If airspace is not secured, a resource would want to take advantage of the surroundings by approaching the target from a direction where for example high hills and tall buildings protect it from being detected. This could mean flying at low altitude, and if so a missile fighting the target should be "tossed in" towards the target rather than being launched straight towards it.

Thus, in for example tossing missiles or lobbing missiles, tactical flexibility is opened when no air supremacy is the general condition. In that case an aircraft can hide by terrain following or low altitude flight followed by an attack with a lobbed missile path instead of attacking at a higher altitude with an increased risk exposure. Tossing or lobbing as an attack alternative is implemented by extending the types of attacks possible in the network, wherein characteristics for each attack type is included in the network.

The processing involves forming the mission plan for fighting the targets based on the determined target effects from the respective attack directions and based on the formed network of possible routes, wherein each target is fighted a predetermined amount of times.

The post processing comprises a deconfliction step, which can be used to confirm that the proposed flight paths are realizable, i.e. safe and sound from a pilots view. Any collision courses should be resolved, either by separating the conflicting paths in space (altitude) or delay one of the paths in time.

We herein describe an example of a model for mission planning. This exemplified model is based on some assumptions and simplifications.

The first assumption is that each attack requires two aircraft to team up, where one of them illuminates the target. For example, the target is illuminated with a laser beam. The other aircraft launches the weapon (bomb or missile). In this model, we assume that the flight direction of the aircraft is directed towards the target at the time of the launch. Of course many other ways of modelling the flight direction at the time of launch are available.

The illumination is used to guide the weapon towards its target, providing high accuracy of the impact. During guidance, the light beam is continuously visible for the weapon. This means that the aircraft need to rendezvous not only in time, but also in such a way that the illumination is visible for the attacker at the launch of the weapon. Hence, the illumination begins shortly before the launch of the weapon and has to continue until impact.

When a target is attacked, the air around it will be filled with dust and debris, and due to the prevailing wind conditions this might reduce the visibility of nearby targets. Hence, some precedence constraints may be given, specifying which targets that are not allowed to be attacked before other targets.

The expected effect of an attack depends, of course, of the kind of weapon being used, which is decided in advance, but also of the direction of the impact and its kinetic energy. The latter factors depend on the velocity and altitude of the aircraft at the time of the launch. Further, if the weapon passes through defended airspace, its expected effect is reduced.

No matter how accurate the attack can be performed, the neighbouring area of the target is always subject to a certain risk of collateral damage, because the weapon can miss its target. This can be due to for example loss of visibility of the illumination, malfunction of the weapon or defence measures.

We refer to the area of unacceptably high risk for collateral damage as the footprint of the attack. The extension of the footprint depends on the altitude and velocity of the attacker. The footprint is in our description of the problem simply given by a straight line from the attack position towards the target, and an angle of maximal deviation from this line. This construction gives a for example ellipsoid-shaped footprint on the ground.

An attack direction or attack position is determined to be feasible if no protected object is inside its footprint. For a given target, and a resource with specified characteristics such as velocity, altitude and armament, one can derive a region of feasible attack directions or attack positions, referred to as the feasible attack space for that target. Each attack directions or attack position in this space is associated with a number of feasible illumination positions. One illumination path can be compatible with multiple attack positions. In one example, each illumination path is compatible with one attack direction.

Each resource has a limited armament capacity, meaning that it cannot carry more than a certain amount of weapons. This limits the number of attacks the resource can perform. In addition to the armament, an resource can also carry an illumination system such as a laser pod. Without the illumination system, the resource can only perform attacks. A resource might also be equipped with the illumination system only, hence only be capable of performing illumination.

Note that once the planning of the mission has been made, it is also known how each and one of the resources shall be equipped in order to be able to fulfil its tasks during the mission.

For a specific type of resource and a target requiring a specific type of weapon, one can derive the feasible attack space against each target. The feasible attack space is herein represented by an inner and an outer radius delimiting an engagement zone. The feasible attack space can further be represented by an upper and a lower altitude. Accordingly, the attack space for each target can be visualized as a hollow cylinder.

The hollow cylinder can be divided into altitude layers and into a number of sectors. In the sectors, feasible attack directions or positions are discretizised. For each and one of these we create compatible illumination paths. Since in the herein described example, only feasible attack positions are included, and these depend on the presence of protected objects and air defence, the number of such positions in each sector might vary.

In the illustrated example, three discrete attack positions are formed in each sector and on each altitude. In the illustrated example two common illumination alternatives are available for these three positions. For both illumination alternatives, the illumination of the aircraft goes on during the flight from a starting position to an end position. The two illumination alternatives are obtained by interchanging the roles of these two positions and reversing the flight direction. The two paths are chosen so that the illuminating resource is flying essentially clockwise or counter-clockwise in relation to the target.

By performing a discretization of the feasible attack space, or engagement zone, around each target, representing attack and illumination positions by nodes, and aircraft movements by routes or arcs, the mission planning problem can partly be represented by a network. An origin and a destination are introduced to represent the crossing of the entrance and exit lines of the target scene, respectively.

Each target is in the illustrated example attacked and illuminated exactly once. An aircraft cannot both attack and illuminate a target at the same time. Hence, the network only contains arcs or routes between nodes corresponding to different targets, or from the origin or to the destination. The exceptions are arcs or routes connecting the starting and ending nodes of each illumination alternative, which are also included in the network although they correspond to the same target.

Moreover, no arcs or routes should violate any given precedence constraints between targets. Hence there might be arcs or routes from attack nodes for a first target towards attack and illumination nodes for a second target, but not the other way around, depending on the given precedence relations.

On a more abstract level, nodes in the network can be clustered and represented so that each target is associated with two clusters, one containing all attack nodes (A) and the other containing illumination nodes (I).

For calculating the arc or route costs in the network representation of the problem, in one example distances between all candidate positions are used. A feasible arc or route between two positions (nodes) is an arc or route where restrictions of aircraft dynamics is taken into account, if the resource is an aircraft. The restrictions include for example turning radius and other physical limitations. The route or arc also needs to be safe, meaning that the resource should not pass through defended airspace.

In the literature, the problem of finding an optimal flight path from a given starting point to a given destination, while avoiding obstacles, such as defended airspace, is referred to as the Aircraft Routing Problem. This is in itself an optimization problem, not addressed herein. The art comprises solutions for solving the Aircraft Routing Problem. Any flight path generator can be used. The flight path generator takes in one example aircraft dynamics into account. The flight path generator is in one example based on a discretization of the airspace and a calculation of a shortest path.

The result of each such routing problem is a feasible path, with a certain length, which can be converted into a time required to traverse it. Note that the arc or route lengths and travelling times obtained are not symmetric. In the herein described network representation, the nodes are associated with both a location and a travel direction at the location. Because of these travel directions and dynamics of the vehicle such as flight dynamics, the path lengths and path times will in general be asymmetric.

In addition to the time attribute, each arc leaving an attack position also has an attribute that states the expected effect against the target associated with the attack position.

The above is described using a mathematical description according to below.

Given is an aircraft fleet R, and a set of targets M to be attacked. Each target $m \in M$ is associated with a feasible space of attack positions, discretized into attack positions $N_m^A$ and their compatible illumination positions, $N_m^I$. Furthermore, each feasible attack space is divided into G sectors, and we let G denote the set of all sectors for all targets while $G_m$ is the set of sectors that belong to target $m \in M$.

Let $A_g$ and $I_g$ denote the set of arcs (i,j) such that position j is an attack position and illumination position respectively in sector g, for all sectors $g \in G$. Further, let $AI_g$ denote the set of arcs (i,j) such that position j is either an attack position or an illumination position for all sectors $g \in G$.

Furthermore, let N denote all positions in the graph, including the origin and the destination, while N* denotes the set of all positions except the origin and the destination. Also, let A denote all arcs in the network.

Each aircraft $r \in R$ is limited to carry at most $\Gamma$ weapons, and let $q_m$ denote the number of weapons needed towards target $m \in M$.

Let S denote the set of ordered pairs (m, n) of targets such that target m cannot be attacked before target n. If no precedence relations are given a priori, the set S is empty.

Let $c_{ij}^r$ denote the cost of arc (i,j) for aircraft r. For arcs leaving attack positions, that is $i \in N_m^A$; $m \in M$, the value of $c_{ij}^r$ is the expected effect of the attack. Otherwise, $c_{ij}^r$ takes the value zero.

Further, let $T_{ij}^r$ denote the time needed for aircraft $r \in R$ to traverse arc $(i, j) \in A$. We also introduce $T_{max}$, either as a pessimistic estimate of the total mission time or as a given upper time limit for the duration of the mission.

We introduce two types of variables, the binary routing variables $x_{ij}^r$ and the continuous time variables $t_i^r$, $t_m^A$, $t_m^I$ and $t_F$. The routing variable $x_{ij}^r$ equals one if aircraft $r \in R$ traverses arc $(i, j) \in A$. Otherwise it is zero. Variable $t_i^r$ is the time at which aircraft $r \in R$ visits node $i \in N$ and it is equal to zero if the aircraft does not visit the node. Variables $t_m^A$ and $t_m^I$ are the times of the attack and illumination, respectively, of each target $m \in M$. $t_F$ is the time of the last aircraft to exit the target scene.

The mathematical model for the Military Aircraft Mission Planning Problem (MAMPP) is given below.

$$\max \sum_{r \in \mathcal{R}} \sum_{(i,j) \in A} c_{ij}^r x_{ij}^r - \mu t_F \quad \text{[MAMPP]}$$

$$\text{s.t.} \sum_{(o,j) \in A} x_{oj}^r = 1, r \in \mathcal{R} \quad (1a)$$

$$\sum_{(i,d) \in A} x_{id}^r = 1, r \in \mathcal{R} \quad (1b)$$

$$\sum_{(i,k) \in A} x_{ik}^r - \sum_{(k,j) \in A} x_{kj}^r = 0, r \in \mathcal{R}, k \in N^* \quad (2)$$

$$\sum_{r \in \mathcal{R}} \sum_{g \in \mathcal{G}_m} \sum_{(i,j) \in A_g} x_{ij}^r = 1, m \in \mathcal{M} \quad (3)$$

$$\sum_{r \in \mathcal{R}} \sum_{g \in \mathcal{G}_m} \sum_{(i,j) \in I_g} x_{ij}^r = 1, m \in \mathcal{M} \quad (4)$$

$$\sum_{r \in \mathcal{R}} \sum_{(i,j) \in A_g} x_{ij}^r - \sum_{r \in \mathcal{R}} \sum_{(i,j) \in I_g} x_{ij}^r = 0, g \in \mathcal{G} \quad (5)$$

$$\sum_{g \in G_m} \sum_{(i,j) \in AI_g} x_{ij}^r \leq 1, r \in \mathcal{R}, m \in \mathcal{M} \quad (6)$$

$$\sum_{m \in M} \sum_{g \in \mathcal{G}_m} \sum_{(i,j) \in A_g} q_m x_{ij}^r \leq \Gamma, r \in \mathcal{R} \quad (7)$$

$$t_i^r + T_{ij}^r x_{ij}^r - T_{max}(1 - x_{ij}^r) \leq t_j^r, r \in \mathcal{R}, (i, j) \in A \quad (8)$$

$$t_i^r - T_{max} \sum_{(i,j) \in A} x_{ij}^r \leq 0, r \in \mathcal{R}, i \in N \quad (9)$$

$$t_o^r = 0, r \in \mathcal{R} \quad (10)$$

$$\sum_{r \in \mathcal{R}} \sum_{i \in N_m^A} t_i^r = t_m^A, m \in \mathcal{M} \quad (11)$$

$$\sum_{r \in \mathcal{R}} \sum_{i \in N_m^I} t_i^r = t_m^I, m \in \mathcal{M} \quad (12)$$

$$t_m^A = t_m^I, m \in \mathcal{M} \quad (13)$$

$$t_m^A \geq t_n^A, (m, n) \in S \quad (14)$$

$$t_F \geq t_d^r, r \in \mathcal{R} \quad (15)$$

$$x_{ij}^r \in \{0, 1\}, r \in \mathcal{R}, (i, j) \in A \quad (16)$$

$$t_i^r \geq 0, r \in \mathcal{R}, i \in N \quad (17)$$

$$t_m^A, t_m^I \geq 0, m \in \mathcal{M} \quad (18)$$

$$t_F \geq 0, \quad (19)$$

The objective is to maximize the expected effect against all targets, weighted against the total mission time, that is the time of the last aircraft to pass the exit line, by parameter $\mu \geq 0$. Constraints (1) and (2) ensure that each aircraft enters and leaves the target scene via the origin and end nodes. (3) ensures that each target $m \in M$ is attacked by exactly one aircraft. (4) ensures that each target $m \in M$ is illuminated by exactly one aircraft.

Constraint (5) ensures that the attack and the illumination against each target are compatible. This means that constraint (5) ensures that the nodes belong to the same sector. In a sector where no attack is performed, no illumination can be performed either, and vice versa.

Constraint (6) states that each aircraft can visit each target at most once. This constraint is actually redundant since the time propagation constraint (8) together with the synchronization constraint (13) makes it impossible for one resource to both attack and illuminate the same target, but it results in a model with a more tight linear programming relaxation. Constraint (7) is the armament capacity constraint and limits each aircraft to utilize at most $\Gamma$ missiles.

Constraint (8) propagates time for each aircraft, making sure that if aircraft r traverses arc (i,j), node j is visited no earlier than the time of the visit to node i plus the time needed to traverse the arc. Note that constraint (8) also eliminates subtours. Constraint (9) enforces that $t_i^r = 0$ holds if node i is not visited by aircraft r. Constraint (10) states that all aircraft start from the origin at time zero. Constraints (11) and (12) assign the correct times of attack and illumination, respectively, for each target m. Constraint (13) states that these times need to coincide, so that synchronization in time is achieved. Constraint (14) makes sure that targets are attacked in the prescribed precedence order. It is possible to eliminate variables $t_m^A$ and $t_m^I$ from the model, but they are kept for the sake of readability.

Although the network does not contain arcs that violate the precedence relationships, constraint (14) is still present to further confirm that these relationships are not violated. Constraint (14) is present in the illustrated example because the attack sequences of two aircraft might together violate precedence, even though each of them does not.

Finally, constraint (15) finds the maximum time of return to the destination node among all aircraft, to be used in the objective.

The model presented above belongs to the class of Vehicle Routing Problem (VRP). Attack and illumination points are nodes, and paths between such positions are arcs. The aircraft fleet correspond to resources with capacity constraints on their weapon load, and targets correspond to customers. The model has the following non-standard characteristics.

i) It is generalized in the respect that exactly one node in each cluster shall be visited.

ii) Since the attack and illumination positions for a target need to be compatible, the visits to attack and illumination clusters are coupled by side constraints.

iii) The visits to the compatible attack and illumination nodes for a target are required to be synchronized in time.

iv) The order in time of the visits to the pairs of attack and illumination clusters of all targets are constrained by precedence relations, if any.

In the Generalized Travelling Salesman Problem known in the art, the nodes are partitioned into clusters and the salesman shall visit exactly one node in each cluster, at minimum cost. The model herein described relates to a corresponding generalization of the Vehicle Routing Problem (GVRP).

The model presented above is in one example extended. Due to the presence of $T_{max}$ in constraints (8) and (9), the linear problem relaxation may be weak. For the specific instances of the problem herein solved, it is possible to strengthen the model. Since scenarios including for example eight targets are considered to be large instances, one can introduce an extra binary variable $u_{mn}^r$ that equals one if aircraft r travels directly from target m to target n, and zero otherwise. These variables are defined on the set of ordered pairs $A_M = (M \times M) \setminus S$. The $x_{ij}^r$ and $u_{mn}^r$ variables are coupled by $$\sum_{i \in N_m, j \in N_n} x_{ij}^r = u_{mn}^r, r \in \mathcal{R}, (m, n) \in A_{\mathcal{M}}$$

where $N_m$ denotes all nodes connected to target m.

Even for a scenario with ten targets, there are only $K = 2^{10} - 1 = 1023$ nonempty subsets of targets Sk, used to define subtour eliminating constraints with respect to the new variables $u_{mn}^r$. By adding them all, the model is strengthened significantly.

$$\sum_{m \in S_k, n \in S_k} u_{mn}^r \leq |S_k| - 1, r \in \mathcal{R}, k = 1, \ldots, K$$

Also, as always in VRP problems where resources are identical, symmetry is an issue. It is possible, without loss of generality, to add constraints stating that the first target is attacked by a specific aircraft and illuminated by another specific aircraft. For the special case of only two aircraft, one can also add constraints forcing them to traverse the targets in the same order, i.e $u_{mn}^1 = u_{mn}^2$ The aircraft fleet can of course be required to be utilized in different ways. For example, an aircraft $r_1$ can be dedicated to operate pairwise with another aircraft $r_2$ throughout the mission. The mission is then modelled as $u_{mn}^{r1} = u_{mn}^{r2}$. An aircraft r can also be given a dedicated role throughout the mission, that is, performing attacks or illuminations only. This is modelled by $x_{ij}^r = 0$ for all $(i,j) \in I_g$, $g \in G$ and $x_{ij}^r = 0$ for all $(i,j) \in A_g$, $g \in G$ respectively. Both assumptions, working pairwise and dedicated roles, can be utilized simultaneously.

In an alternative example, a model for mission planning is formed in accordance with below. Instead of routing variable $x_{ij}^r$ between all nodes, it is based on routing variable $u_{mn}^r$ as defined earlier, and a binary variable $y_i^r$ which is equal to one if node i is visited by resource r, and zero otherwise. This reduces the number of binary variables drastically.

The following notation is introduced. For each sector $g \in G$, the attack positions are denoted $N_g^A$ and their compatible illumination positions are denoted $N_g^I$. We also need to find tuples (i, j, m, n) such that node i and node j belongs to target m and target n, respectively. Arcs (i, j) exist and aircraft are allowed to go directly from target m to target n.

$IDX := \{(i,j,m,n) | (m,n) \in A_{\mathcal{M}}, (i,j) \in A: i \in N_m, j \in N_n\}$ A new auxiliary variable $\alpha_{ij}$ is also used in order to model an equivalent objective function. This variable becomes non-zero exactly when a resource r travels between targets m and n, and one variable $y_i^r$ is active at both targets, that is, equivalent to our previously described variable $x_{ij}^r$.

$$\min \sum_{(i,j) \in A_r} \alpha_{ij} + \mu t_F \qquad \text{[MAMPPv2]}$$

s.t.

$$\sum_{(o,n) \in A_{\mathcal{M}}^r} u_{on}^r = \sum_{(m,d) \in A_{\mathcal{M}}^r} u_{md}^r = 1 \ r \in \mathcal{R} \qquad (1)$$

$$\sum_{(m,k) \in A_{\mathcal{M}}^r} u_{mk}^r - \sum_{(k,n) \in A_{\mathcal{M}}^r} u_{kn}^r = 0 \ r \in \mathcal{R}, k \in \mathcal{M} \qquad (2)$$

$$\sum_{\substack{m \in S_k, n \in S_k: \\ (m,n) \in A_{\mathcal{M}}}} u_{mn}^r \leq |S_k| - 1 \ r \in \mathcal{R}, k \in \mathcal{K} \qquad (3)$$

$$\sum_{r \in \mathcal{R}} \sum_{i \in N_m^A} y_i^r = 1 \ m \in \mathcal{M} \qquad (4a)$$

$$\sum_{r \in \mathcal{R}} \sum_{i \in N_m^I} y_i^r = 1 \ m \in \mathcal{M} \qquad (4b)$$

$$\sum_{r \in \mathcal{R}} \sum_{i \in N_g^A} y_i^r - \sum_{r=1} \sum_{i \in N_g^I} y_i^r = 0 \ g \in \mathcal{G} \qquad (5)$$

$$\sum_{i \in N_m} y_i^r \leq 1 \ r \in \mathcal{R}, m \in \mathcal{M} \qquad (6)$$

$$\sum_{m \in \mathcal{M}} \sum_{i \in N_m} q_m y_i^r \leq \Gamma, r \in \mathcal{R} \qquad (7)$$

$$\sum_{(m,k) \in A_{\mathcal{M}}^r} u_{mk}^r = \sum_{(k,n) \in A_{\mathcal{M}}^r} u_{kn}^r = \sum_{i \in N_k} y_i^r \ r \in \mathcal{R}, k \in \mathcal{M} \qquad (8)$$

-continued $$y_k^r = 1 \ r \in \mathcal{R}, k \in \{o, d\} \quad (9)$$

$$t_i^r + T_{ij}^r \cdot (y_i^r + y_j^r + u_{mn}^r - 2) - T_{max} \cdot (3 - y_i^r - y_j^r - u_{mn}^r) \leq$$
$$t_j^r \ r \in \mathcal{R}, \binom{i, j}{m, n} \in IDX \quad (10)$$

$$t_i^r - T_{max} \cdot y_i^r \leq 0 \ r \in \mathcal{R}, i \in N \quad (11)$$

$$t_o^r = 0 \ r \in \mathcal{R} \quad (12)$$

$$c_{ij}^r \cdot (y_i^r + y_j^r + u_{mn}^r - 2) \leq \alpha_{ij} r \in \mathcal{R}, \binom{i, j}{m, n} \in IDX \quad (13)$$

$$\sum_{r \in \mathcal{R}} \sum_{i \in N_m^A} t_i^r = t_m^A \ m \in \mathcal{M} \quad (14)$$

$$\sum_{r \in \mathcal{R}} \sum_{i \in N_m^I} t_i^r = t_m^I \ m \in \mathcal{M} \quad (15)$$

$$t_m^A = t_m^I \ m \in \mathcal{M} \quad (16)$$

$$t_m^A \geq t_n^A \ (m, n) \in \mathcal{S} \quad (17)$$

$$t_F \geq t_d^r \ r \in \mathcal{R} \quad (18)$$

$$u_{mn}^r \in \{0, 1\} \ r \in \mathcal{R}, (m, n) \in A_\mathcal{M} \quad (19)$$

$$y_i^r \in \{0, 1\} \ r \in \mathcal{R}, i \in N \quad (20)$$

$$z_g \in \{0, 1\} \ g \in \mathcal{G} \quad (21)$$

$$t_i^r \geq 0 \ r \in \mathcal{R}, i \in N \quad (22)$$

$$t_m^A, t_m^I \geq 0 \ m \in \mathcal{M} \quad (23)$$

$$t_F \geq 0, \quad (24)$$

$$\alpha_{ij} \geq 0 \ (i, j) \in A \quad (25)$$

This model is formulated as a minimization problem, although the objective is of course still to maximize the expected effect against all targets, weighted against the total mission time. Constraints (1) and (2) ensure that each aircraft enters and leaves the target scene via the start and end nodes, and (3) is the previously described subtour eliminating constraints. Constraint (4a) ensures that each target m∈M is attacked by exactly one aircraft, and (4b) does the same for illumination. Constraint (5) ensures that the attack and the illumination against each target are compatible. In this example, the attack and illumination are compatible when belonging to the same sector.

Constraint (6) states that each aircraft can visit each target at most once, and (7) is the armament capacity constraint. The armament capacity constraint limits each aircraft to utilize at most Γ missiles. Constraint (8) couples variables $u_{mn}^r$ and $y_i^r$. Constraint (9) states that each aircraft must leave the origin and return to the destination.

Constraint (10) propagates time for each aircraft, making sure that if aircraft r visits node i at target m directly followed by a visit at node j at target n, node j is visited no earlier than the time of the visit to node i plus the time needed to travel between the nodes. Note that constraint (10) also eliminates subtours. Constraint (11) enforces that $t_i^r = 0$ holds if node i is not visited by aircraft r. Constraint (12) states that all aircraft start from the origin at time zero. Constraint (13) defines the value of the auxiliary variable $\alpha_{ij}$, so that it becomes equal to the cost of travelling between nodes i and j exactly when a resource r travels between targets m and n, that is, variables $u_{mn}^r$, $y_i^r$ and $y_j^r$ are all active.

Constraints (14) and (15) assign the correct times of attack and illumination, respectively, for each target m. Constraint (16) states that these times need to coincide. Accordingly, constraint (16) controls time synchronization. Constraint (14) makes sure that targets are attacked in the prescribed precedence order, if any. It is possible to eliminate variables $t_m^A$ and $t_m^I$ from the model, but they are kept for the sake of readability.

Constraint (17) prevents violation of the precedence relations. Constraint (18) finds the maximum time of return to the destination node among all aircraft, to be used in the objective.

This second model is interesting since it contains much less binary variables than the first model.

In FIG. 8, a method 800 for mission planning comprises forming the mission plan for fighting targets based on target effects determined from one or a plurality of attack directions associated to each target and based on a network of possible routes formed from the determined attack directions.

In detail, the method comprises in the illustrated example
providing 805 information related to a target scene, said information comprising information related to a plurality of targets,
providing 810 information related to a plurality of resources for target attack,
determining 820 at least one possible attack direction against each target,
determining 830 a target effect associated to attacking the target from each of said determined at least one possible attack direction for each target,
forming 840 a network of possible routes between the targets for the resources, wherein the possible routes are determined based on the possible attack directions related to each target, and
forming 845 the mission plan for fighting the targets based on the determined target effects from the respective attack directions and based on the formed network of possible routes, wherein each target is fighted a predetermined amount of times.

The providing 805 of the information related to a target scene comprises in one example information related to the target's resistance against attack from different attack directions. The information related to each target comprises in one example information related to the collateral damage caused by an attack from the respective attack directions. The information related to the target scene comprises in one example information related to at least one object to be protected. The information related to the target scene comprises in one example information related to at least one threat in the target scene. The information related to the target scene comprises in one example information that the targets are land based.

The providing 810 of the information related to available resources comprises in one example providing resource information such as resource type, such as attack type or illumination type. Some resources may be both of attack type and illumination type. The illumination resource can characteristically illuminate many targets.

The attacking resource has characteristically capacity of attacking a limited number of resources. Each attacking resource may for example carry one to three missiles for fighting the targets. The resource information may also include information related to the specific resources. For example, the information may comprise information related to the characteristics of the attacking resource(s) and/or illumination resource(s).

The step of determining 830 a target effect is in one example based on the information related to the targets of the provided 805 information related to the target scene.

The step of forming 840 the network comprises in one example removing attack directions which would cause collateral damage to the at least one protected object.

In one example, the method 800 further comprises determining 825 for each of said determined at least one possible attack direction for each target at least one possible illumination path for illuminating the target during the attack. The forming 840 of the network includes in accordance with this example forming possible routes between the possible illumination paths related to the respective targets. The forming 845 of the mission plan is then based on the target attack requiring two resources, one attacking resource and one illuminating resource, for at least one of the targets.

In one example, the method 800 comprising providing 815 information related to a preferred sequence of attacking the targets. The forming of the mission plan is then based on the target sequence information.

In one example an engagement zone is defined for each target and each attack direction is determined 820 within said engagement zone. The engagement zone may be three dimensional. The determination of attack direction 820 comprises in one example dividing each attack direction into a plurality of possible attack positions distributed within the engagement zone. The target effect is then determined 830 for each attack position. Further, the network is formed 840 from determining possible routes based on the possible attack positions related to each target.

The step of forming 845 the mission plan forming of the mission plan includes selecting routes between the targets so as to satisfy time limitations for the mission plan.

In one example, the method 800 comprises determining 835 a cost associated to attacking from each attack direction or position for example based on the threat information. The forming 845 of the mission plan can then include selecting routes between the targets based on the costs. The formation 840 of the network includes in one example selecting a subset of the attack directions or attack points based on the costs associated to attacking and basing the network on the subset of attack directions or attack positions.

In one example, the method further comprises a refining step 845, wherein the routes of the resources as defined by the formed mission plan are refined.

In FIG. 9, a system 900 for mission planning is arranged to plan routes for a plurality of resources fighting a plurality of targets. The system comprises memory 901 storing information related to a target scene, said information comprising information related to the targets and information related to available resources. The system also comprises a processing unit 902 arranged to determine at least one possible attack direction against each target, determining a target effect associated to attacking the target from each of said determined at least one possible attack directions for each target, forming a network of possible routes between the targets for the resources, wherein the possible routes are determined based on the possible attack directions, and forming the mission plan for fighting the targets based on the calculated target effects from the respective attack directions and based on the network of possible routes, wherein each target is preassumed to be fighted a predetermined amount of times. The memory 901 is in one example arranged to store the mission plan.

The system herein described provides an Air-to-ground mission decision support tool. The tool comprises for example target sequencing, allocation and routing.

The system comprises in one example a transmitter 903 arranged to transmit the mission plan to the respective resources 904. The resources 904 comprise in one example aerial vehicles. The information provided for making the mission planning is in one example received via an interface 905.

The invention claimed is:

1. Method for mission planning, said method comprising the steps of:
   providing (805) information related to a target scene, said information comprising information related to a plurality of targets,
   providing (810) information related to a plurality of resources for target attack, wherein at least one of the plurality of resources is at least one resource for target illumination,
   determining (820) at least one possible attack direction against each target,
   determining (825), for each of said determined at least one possible attack direction, for each target, at least one possible illumination path for illuminating the target during the attack,
   determining (830) a target effect associated to attacking the target from each of said determined at least one possible attack direction for each target,
   forming (840) a network of possible routes between the targets for the resources, wherein the possible routes are determined based on the possible attack directions related to each target, and wherein the forming of the network includes forming possible routes between the possible illumination paths related to the respective targets, and
   forming (845) the mission plan for fighting the targets based on the determined target effects from the respective attack directions and based on the formed network of possible routes, wherein each target is fought a predetermined amount of times, and wherein the forming of the mission plan is based on the target attack requiring two resources for at least one of the targets, the two resources comprising one attacking resource and one illuminating resource.

2. Method for mission planning according to claim 1, wherein the target effect associated to attacking the target from each of said determined at least one possible attack direction is based on the information related to the targets.

3. Method for mission planning according to claim 2, wherein the information related to the targets comprises the target's resistance against attack from different attack directions.

4. Method for mission planning according to claim 1, wherein the forming of the mission plan for fighting the targets is based on information related to collateral damage.

5. Method according to claim 4, wherein the information related to the target scene comprises information related to at least one object to be protected and wherein the formation of the network comprises removing attack directions which would cause collateral damage to the at least one protected object.

6. A method according to claim 1, further comprising the step of providing (815) information related to a preferred sequence of attacking the targets wherein the forming of the mission plan also is based on the target sequence information.

7. A method according to claim 1, wherein an engagement zone is defined for each target and each attack direction formed within said engagement zone.

8. A method according to claim 7, wherein the engagement zone is three dimensional.

9. A method according to claim 7, wherein at least one of the attack directions is divided into a plurality of possible attack positions distributed within the engagement zone, wherein target effect is calculated for each attack position and wherein the network is formed from determining possible routes based on the possible attack positions related to each target.

10. A method according to claim 1, wherein at least one resource comprises at least one attack capability and one illumination capability.

11. A method according to claim 1, wherein the targets are land based.

12. A method according to claim 1, wherein the step of forming (845) of the mission plan comprises selecting routes between the targets so as to satisfy time limitations for the mission plan.

13. A method according to claim 1, wherein the information related to a target scene comprises information related to at least one threat in the target scene, wherein the method further comprises the step of determining (835) a cost associated to attacking from each attack direction or position based on the threat information and wherein the step of forming (845) of the mission plan comprises selecting routes between the targets based on the costs.

14. A method according to claim 13, wherein the step of formation (840) of the network comprises selecting a subset of the attack directions or attack points based on the costs associated to attacking and basing the network on the subset of attack directions or attack positions.

15. A method according to claim 1, further comprising a post processing step comprising refining (845) the routes of the resources as defined by the formed mission plan.

16. A system (900) for mission planning configured to plan routes for a plurality of resources fighting a plurality of targets, said system comprising:

a memory (901) storing information related to a target scene, said information comprising information related to the targets and information related to available resources; and a processing unit (902) configured for:
  determining at least one possible attack direction against each target,
  determining for each of said determined at least one possible attack direction for each target at least one possible illumination path for illuminating the target during attack,
  determining a target effect associated to attacking the target from each of said determined at least one possible attack directions for each target,
  forming a network of possible routes between the targets for the resources, wherein the possible routes are determined based on the possible attack directions, and wherein the forming of the network includes forming possible routes between the possible illumination paths related to the respective targets, and
  forming the mission plan for fighting the targets based on the calculated target effects from the respective attack directions and based on the network of possible routes, wherein each target is preassumed to be fought a predetermined amount of times, and wherein the forming of the mission plan is based on the target attach requiring two resources for at least one of the targets, the two resources comprising one attacking resource and one illuminating resource.

17. A system according to claim 16, wherein the memory (902) is configured to store the mission plan.

18. A system according to claim 16, further comprising a transmitter (903) configured to transmit the mission plan to the respective resources.

19. A system according to claim 18, wherein the resources comprises aerial vehicles.

\* \* \* \* \*